United States Patent

[11] 3,632,158

| [72] | Inventor | Arliss L. Boothe<br>Indianola, Iowa |
|---|---|---|
| [21] | Appl. No. | 875,932 |
| [22] | Filed | Nov. 12, 1969 |
| [45] | Patented | Jan. 4, 1972 |
| [73] | Assignee | Auto Safety, Inc.<br>Des Moines, Iowa |

[54] VEHICLE CONSOLE
9 Claims, 7 Drawing Figs.

[52] U.S. Cl. .................................................. 296/37 R,
108/44, 206/19.5 R
[51] Int. Cl. .................................................. B60r 7/00
[50] Field of Search .......................................... 108/44;
206/19.5 R; 296/24, 37 R; 297/194; 312/235, 235 A

[56] References Cited
UNITED STATES PATENTS

| 2,633,180 | 3/1953 | Reed .................. | 155/112 |
| 2,797,739 | 7/1957 | Orsini ................ | 155/112 |
| 2,934,391 | 4/1960 | Bohnett .............. | 312/293 |
| 3,244,981 | 4/1966 | Der Tatevasian ... | 325/361 |
| 3,338,629 | 8/1967 | Drees ................. | 297/194 |
| 3,390,309 | 6/1968 | McGrew, Jr. ........ | 317/116 |

*Primary Examiner*—Arthur L. La Point
*Assistant Examiner*—Robert Saifer
*Attorney*—Zarley, McKee & Thomte ABSTRACT: A console adapted to be placed on a vehicle seat with a lip on the lower end extending between the back and seat portions and the front end being engaged by a fastener extending downwardly and rearwardly into engagement with the under front side of the vehicle seat to maintain the console in place on the vehicle seat. A lid is pivotally connected to the top of the unit and when pivoted to an open position, provides a writing surface for the operator of the vehicle and also access into the chamber. The front end of the unit includes a top portion which tapers upwardly and merges into a front wall which extends downwardly and forwardly and the front end is angularly arranged so that the top portion will face the operator of the vehicle and so that communication controls on the top portion and on the front end wall will face the operator of the vehicle as well as provide a rest for the lid when pivoted to an open position.

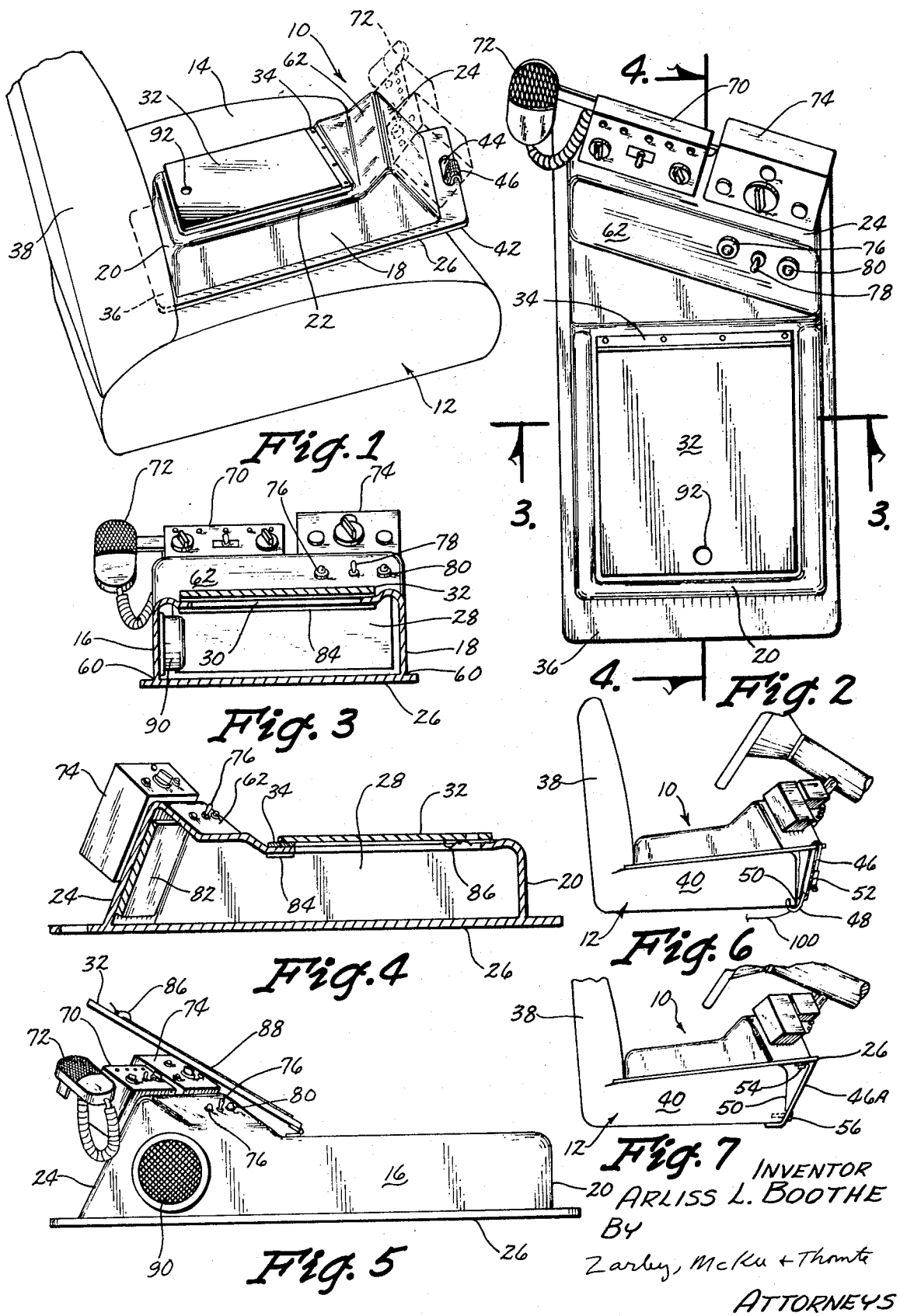

VEHICLE CONSOLE

The usual communication equipment including two-way radios, sirens and flasher lights in police or patrol cars or the like are located on the instrument panel and thus the controls for this equipment are located completely out of normal reach of the driver of the vehicle. An obvious safety hazard is created when it becomes necessary to use this equipment while driving the vehicle. The vehicle console of this invention provides all the controls of the equipment within normal reach of the driver and in such a position that the driver may not take his eyes off the roadway in order to operate the equipment.

Many fleet operators are also plagued with the problem of equipping the fleet uniformly with communications equipment and this is a special problem if the fleet contains more than one type of vehicle. The vehicle console of this invention, however, makes it possible to provide uniformity regardless of the number of different types of vehicles in the fleet.

Since the equipment is mounted on the console which is placed on the seat of the vehicle, it is readily available for maintenance and repair work. The mounting also makes it possible to use any desired brand of two-way radio equipment regardless of the variable configurations involved.

The installation of radio equipment in the usual vehicle is a complicated and involved time-consuming job. However, this invention makes it easy to transfer the communications equipment from one vehicle to another. The elimination of permanent marks such as holes in the vehicle instrument panel greatly enhances the resale value of the vehicle.

Another advantage of the vehicle console of this invention is that operators of vehicles using communication equipment usually have many papers, books, pads and the like and the need for storage for these items. Thus, the compartment in the console which is easily accessible to the operator provides a storage for these items and the lid of the console when either open or closed provides a writing surface.

A further object of this invention is to provide a vehicle console which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a fragmentary perspective view of the vehicle console of this invention shown mounted on a vehicle seat with the two-way radio being shown in phantom.

FIG. 2 is a top plan view of the vehicle console of this invention.

FIG. 3 is a cross-sectional view taken along lines 3—3 of FIG. 2.

FIG. 4 is a cross-sectional view taken along lines 4—4 of FIG. 2.

FIG. 5 is a side elevation view showing the lid in its open raised position resting against the radio equipment.

FIG. 6 is a reduced-in-scale, side elevation view showing the adjustable strap-mounting means for connecting the front end of the console to the lower front edge of the vehicle seat; and, FIG. 7 is a view similar to FIG. 6 but showing a rigid bracket bolted to the front end of the console and to the lower front side of the vehicle seat.

The vehicle console of this invention is referred to generally in FIG. 1 by the reference symbol 10 and is shown placed on the front seat 12 of the vehicle next to the driver's position 14.

The console is of a unitary construction and includes opposite sidewalls 16 and 18, a rear end wall 20, a top wall 22, a front wall 24 and a bottom wall 26. A chamber or compartment 28 is provided by these walls and access is given through an opening 30 normally closed by a lid 32 secured to the top 22 by hinge 34.

It is seen in FIG. 1 that the bottom wall 26 has a rearwardly extending lip 36 which extends between the back and seat portions 38 and 40 respectively of the seat 12. A forwardly extending lip 42 is also provided which includes an opening 44 through which an adjustable strap 46 extends (FIG. 6). The strap includes a hook fastener 48 adapted to engage the bottom front edge 50 of the seat portion 40. A buckle 52 may be adjusted appropriately to tighten the strap and pull the front end of the console 10 downwardly against the resiliency of the seat 40 and thus force the rear end and the lip 36 upwardly against the back portion 38. As also seen in FIG. 6, the belt 46 extends downwardly and rearwardly thus causing the console 10 to normally be pulled back against the back portion 38 to maintain a positive positioning of the console 10 on the seat 12.

As is seen in FIG. 7, an alternate embodiment for the fastener 46 is shown by the fastener 46A which is a rigid bracket secured to the bottom wall 26 by bolts or screws 54 and to the bottom front edge 50 or the seat by a bolt 56.

The console may be molded in two parts from any desirable material such as Kydex 100 available through Rohm & Hass. The bottom wall 26 may be sonically welded to the front, rear and sidewalls along the bottom edges such as at 60 as seen in FIG. 3.

The top wall at the front end includes an upwardly and forwardly extending portion 62 which merges into the front wall 24 which extends downwardly and forwardly. It is seen that the sidewall 18 is shorter in length than the opposite sidewall 16 and thus the top portion 62 and the front wall 24 angle off to cause the top portion 62 to face the vehicle operator and also make it possible for the communication controls as seen in phantom in FIG. 1 to face the operator for convenient reach and use while driving the vehicle.

The communication controls shown are those typically used in law enforcement vehicles and include a two-way radio head 70 including a microphone 72 and an electronic siren unit 74. The control panel portion 62 includes any convenient controls desirable but as shown in FIG. 3, a pilot light 76 for the red top roof light is provided on one side of a two-way switch 78 while a pilot light 80 is provided on the opposite side for a rear amber light.

As seen in FIG. 4 the front wall 24 is additionally strengthened by an additional reinforcing sheet 82 secured thereto by adhesive and similarly a reinforcing strip 84 is provided under the top wall below the hinge 34 for the lid 32.

Additionally, a clip-board-type clip 86 is provided on the rear end of the lid 32 as seen in FIG. 4. However, when the lid is raised to its position as seen in FIG. 5, the clip 86 is at the top of the lid 32 in a position for holding papers or the like 88. It is seen that the lid 32 provides a convenient writing surface either in the position of FIG. 4 or FIG. 5 and that in the position of FIG. 5, the lid rests against the communication equipment 70 and 74. If desired, a speaker 90 may be provided in the console such as in the sidewall 16 as seen in FIG. 5.

Access to the compartment 28 is conveniently available through the opening 30 and a finger hole 92 is provided in the lid 32 for raising the lid.

Thus it is seen in operation that the radio and siren units are mounted on a console unit on the front wall 24 and the pilot lights and switch are mounted in the front top portion 62. The electrical wiring 100 as seen in FIG. 6 may extend downwardly from the console and under the seat to the various components associated therewith. When the communication system of the vehicle is to be removed and installed in a new vehicle, it is only necessary to disconnect the wires 100 and release the fastening strap 46 to release the unit for removal and installation in the new vehicle. A more permanent installation may be provided by use of the rigid bracket 46A as seen in FIG. 7.

While the operator of the vehicle is driving, he has right beside him and facing him the controls for the two-way radio and the siren as well as the flashing lights on the vehicle when being used for law enforcement purposes. The many small items carried by the typical law enforcement officer or maintenance man may be carried in the compartment 28 of the console with easy access through the opening 30 covered by the lid 32. A writing surface is provided when the lid is in its down position of FIG. 4 and is also provided when the lid is raised as seen in FIG. 5.

I claim:

1. A vehicle console comprising
a unit having bottom, side, front and rear, and top walls forming a chamber therebetween,
said top wall having an opening formed therein to provide access to said chamber and a pivotal lid normally covering said opening and adapted to be pivoted to a raised open position, said top wall including a front portion extending upwardly and forwardly and merging into said front wall which extends downwardly and forwardly, said sidewalls being unequal in length and said top portion and said front wall extending therebetween thereby extend at an angle relative to a perpendicular plane between said sidewalls, and communication controls being mounted in said front portion and on said front wall to be positioned towards a vehicle operator sitting next to said unit.

2. The structure of claim 1 including securing means at the front and rear ends of said unit for securing said unit to a vehicle seat.

3. The structure of claim 2 wherein said securing means includes a lip portion extending rearwardly of the rear wall and adapted to be positioned between the back and seat portion of a vehicle seat, and said front securing means adapted to hold the front end of said unit down against a seat and the rear end back against said back of said vehicle seat.

4. The structure of claim 3 wherein said securing means of the front end of said unit includes a rigid element secured to the front end of said unit and extends downwardly and rearwardly for engagement with the bottom of the seat of a vehicle seat.

5. The structure of claim 3 wherein said securing means at the front end of said unit includes an adjustable strap connected to the front end of said unit and adapted to be connected to the bottom of said seat of said vehicle seat, said strap adapted to be positioned to extend downwardly and rearwardly of the front end of said unit.

6. The structure of claim 5 wherein said securing means at said front end of said unit includes a forwardly extending lip having an opening to receive said strap, and a hook element is positioned on the bottom end of said strap and is adapted to engage the bottom of a vehicle seat.

7. The structure of claim 1 wherein said lid is arranged such that when it is raised, it is operatively positioned against said front portion and said communication controls to provide a writing surface convenient to a vehicle operator.

8. The structure of claim 7 wherein said lid includes a clip on the inner side at the rear end whereby when said lid is raised to its open position, said clip is at the top of said lid for holding papers in a position to be written upon.

9. The structure of claim 8 wherein said communication controls include a two-way radio, microphone, switches for a siren and a flashing vehicle roof light, and a speaker located in one of said walls.

* * * * *